United States Patent
Shahid (10) Patent No.: US 6,234,681 B1
(45) Date of Patent: May 22, 2001

(54) APPARATUS AND METHOD FOR INTERCONNECTING OPTICAL FIBERS

(75) Inventor: Muhammed Afzal Shahid, Snellville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/316,813

(22) Filed: May 21, 1999

(51) Int. Cl.$^7$ ........................................ G02B 6/38
(52) U.S. Cl. .................................................. 385/65
(58) Field of Search .................. 385/65–70, 50, 385/54, 80, 88–90, 147

(56) References Cited

U.S. PATENT DOCUMENTS

| | | | |
|---|---|---|---|
| 4,093,341 | * 6/1978 | Crick | 385/59 |
| 4,186,999 | * 2/1980 | Harwood | 257/98 |
| 4,818,059 | 4/1989 | Kakii et al. | 350/96.21 |
| 4,973,127 | 11/1990 | Cannon, Jr. et al. | 350/96.22 |
| 5,082,346 | 1/1992 | Myers | 385/54 |
| 5,287,426 | 2/1994 | Shahid | 385/85 |
| 5,388,174 | 2/1995 | Roll et al. | 385/80 |
| 5,603,879 | 2/1997 | Roll et al. | 264/1.25 |
| 5,613,024 | 3/1997 | Shahid | 385/52 |

* cited by examiner

*Primary Examiner*—Akm E. Ullah
(74) *Attorney, Agent, or Firm*—John M. Harman (57) ABSTRACT

Embodiments of the invention include an optical fiber connector that supports a linear array or ribbon array of optical fibers. The connector includes a pair of intermatable housing members that, when mated, define a connector having a front end suitable for butt coupling to other connectors or compatible connections, a back end for terminating an array of optical fibers, and a plurality of waveguides or optical fiber support grooves extending from the front end to the back end. According to embodiments of the invention, the back end has at least one feature that increases the opening formed by the housing members at the back end of the connector, thus making it easier to terminate an optical fiber or array of optical fibers therein that optically couples to the waveguide or optical fibers terminated in the front end. For example, one or both housing members include a beveled or curvelinear portion, both of which increase the opening between the housing members at the back end of the connector. Alternative embodiments include methods for using such optical fiber connectors in an optical fiber communication system, methods for making such optical fiber connectors and optical waveguide systems employing such optical fiber connectors.

29 Claims, 4 Drawing Sheets

APPARATUS AND METHOD FOR INTERCONNECTING OPTICAL FIBERS

BACKGROUND OF THE INVENTION

1. Field of the Invention

The invention relates to optical fiber interconnections. More particularly, the invention relates to devices and methods for interconnecting multi-fiber arrays such as optical fiber ribbons.

2. Description of the Related Art

Although optical fibers are common in current communication systems, methods, systems and devices for interconnecting optical fibers continue to evolve. Optical fibers typically must be connected end to end, and with a precision sufficient to align fiber waveguide cores to within a few microns, and often within a fraction of a micron. This requirement is further complicated when multi-fiber arrangements such as linear arrays (or ribbon arrays) are employed.

One type of fiber array interconnection includes mechanical splicing, in which a sleeve or other splicing device aligns a fiber or array of fibers, e.g., using one or more fiber support grooves, and holds the aligned fibers in place, e.g., by bonding or clamping the fibers to one or more portions of the splicing device. For discussion of the use of v-groove fiber supports in optical fiber interconnection, see, e.g., U.S. Pat. Nos. 5,603,870, 5,287,426 and 5,613,024, all of which are assigned to the assignee of this application.

Another type of fiber array interconnection includes terminating a first fiber or fiber array in a first connector, terminating a second fiber or fiber array in a second connector and then aligning and connecting the two connectors, e.g., by butt coupling. Connectors used in this manner typically are formed by mating upper and lower plates with fiber support grooves formed therein. Typically, the fiber arrays to be interconnected are cleaved, stripped and positioned between the plates, which then are mated and held together by some appropriate clamping device or bonding material. The excess fiber ends and the connector coupling surface are polished to enhance subsequent coupling with another fiber connector. For example, in one conventional arrangement, mechanical transfer (MT) connectors have polished fiber array and connector ends mated with the polished ends of corresponding MT or MT-compatible connectors. The connectors are aligned using, e.g., aligning pins, and are held together using, e.g., a sleeve, clamp, spring or other suitable connecting device or technique. See, e.g., the optical fiber connectors and connector housings in U.S. Pat. No. 5,082,346, which is assigned to the assignee of this application.

Because of the precision required in splicing and terminating optical fibers, particularly, multi-fiber arrangements, optical fiber interconnections performed in the field generally are not favored. Often, optical fibers and fiber arrays are aligned and terminated in a controlled environment, and the only function suitable for effectively performing in the field is the final connection of the pre-terminated connector plugs. Such plugs often have some type of spring-fit, snap-fit or other relatively basic mechanical configuration for connection with one another that allows consistent, repeatable connecting operations to be performed in the field.

What is needed is a system, device and/or method that allows more fiber interconnection functionality to be performed in the field in an accurate, consistent manner. For example, the ability to accurately terminate an optical fiber or fiber array in the field is desired.

SUMMARY OF THE INVENTION

The invention is embodied in an optical fiber connector that supports a linear array or ribbon array of optical fibers. The connector includes a pair of intermatable housing members that, when mated, define a connector having a front end suitable for butt coupling to other connectors or compatible connections, a back end for terminating an array of optical fibers, and a plurality of waveguides or optical fiber support grooves extending from the front end to the back end. According to embodiments of the invention, the second end has at least one feature that increases the opening formed by the housing members at the second end of the connector, thus making it easier to terminate an optical fiber or array of optical fibers in the second end that optically couples to the waveguide or optical fibers terminated in the first end. For example, one or both housing members includes a beveled or curvelinear portion, both of which increase the opening between the housing members at the back end of the connector.

An alternative embodiment of the invention includes a method for using an optical fiber connector in an optical fiber communication system. The method includes providing an optical fiber having a front end suitable for butt coupling to compatible connectors and a back end suitable for field termination of optical fiber arrays, and inserting an optical fiber array into the back end of the connector to optically couple the optical fiber array with the waveguides or optical fibers terminated in the front end of the connector. The back end of the connector includes a beveled or curvelinear region that increases the size of the opening and thus makes field termination easier than conventional arrangements.

Yet another embodiment of the invention includes a method for making an optical fiber connector that is suitable for field termination. The method includes providing intermatable housing members having a front end and a back end, and mating the housing members to define one or more waveguides or optical fiber support v-grooves extending from the front end to the back end. The back end of the connector includes a beveled or curvelinear region that increases the size of the opening and thus makes field termination easier.

Still another embodiment of the invention includes an optical waveguide system for transmitting optical energy. The system includes at least one source of optical energy, at least one receiver for receiving optical energy, and an optical energy transmission medium coupled between the source and the receiver for transmitting optical energy from the source to the receiver. The optical energy transmission medium includes a connector for terminating an array of optical fibers for optically coupling to a corresponding array of optical fibers within the optical energy transmission medium. The connector includes a pair of intermatable housing members defining a front end suitable for optically butt coupling with compatible connectors, a back end for terminating an array of optical fibers, and a plurality of waveguides or optical fiber support grooves extending from the front end to the back end. The back end includes a beveled region and/or a curvelinear region that makes it easier to terminate a fiber optic array therein that optically couples to the waveguides or optical fibers terminated in the front end.

DETAILED DESCRIPTION

In the following description similar components are referred to by the same reference numeral to enhance the understanding of the invention through the description of the drawings.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Figure 1:
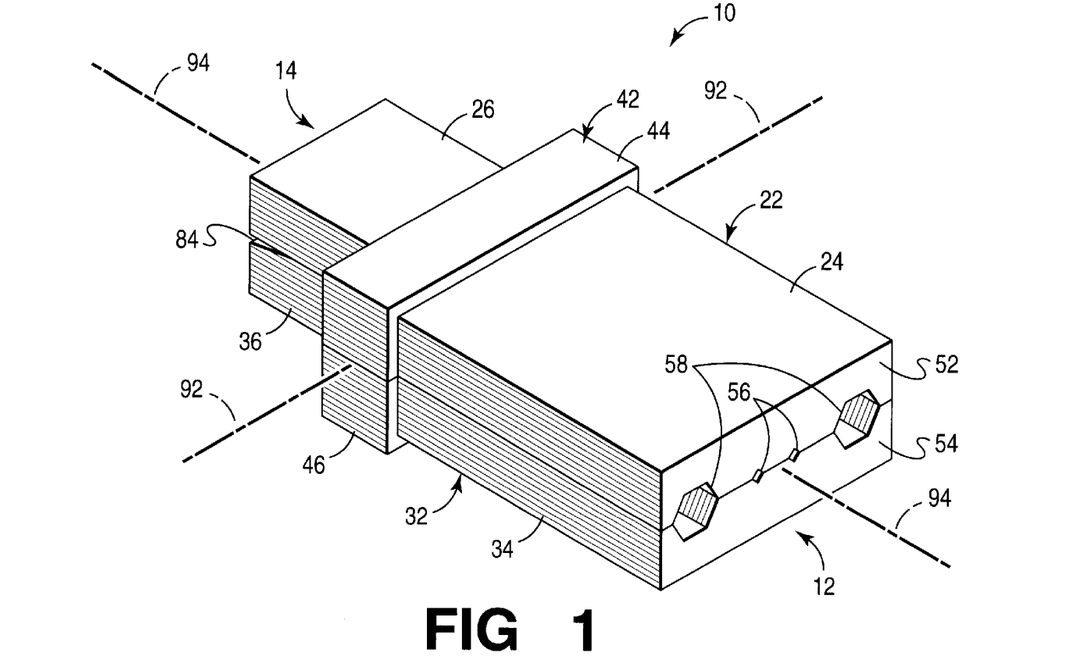
FIG. 1 is a front, perspective view of a connector according to an embodiment of the invention.

Referring now to FIG. 1, a connector 10 for connecting and/or splicing one or more optical fibers according to embodiments of the invention is shown. It should be remembered that the connector 10 is an exemplary configuration shown for illustration purposes only and is not meant to be any kind of limitation of embodiments of the invention. Also, the configuration has not been drawn to scale for ease of explanation.

The connector 10 includes a front end 12 and a back end 14 and is formed by mating a first or upper housing member 22 having a (first) front end 24 and a (first) back end 26 with a complementary second or lower housing member 32 having a (second) front end 34 and a (second) back end 36. The front and back ends of the housing members generally are separated visually (not necessarily physically) by a collar 42 formed by a first or upper collar portion 44 and a second or lower collar portion 46. The housing members are made of, e.g., any moldable material such as plastic. The upper and lower housing members generally have similar but complementary features that facilitate their mating to form the connector 1 0

The upper housing member 22 has a (first) front end surface 52 that, along with a (second) front end surface 54 of the lower housing member 32, defines a front surface of the connector 10. Typically, the front surface of the connector 10 is smooth and polished for coupling to other connectors of the kind or to compatible connectors.

The front end of the connector 10 includes a first set of openings 56 that defines, e.g., a set of waveguides or optical fiber support grooves, as will be discussed in greater detail hereinbelow. The openings 56 define a plurality of optical waveguides or provide support grooves for an array of optical fibers such as a ribbon array. Typically, the fibers are bonded within the support grooves in the front end, e.g., in a conventional manner. Also, the front end of the connector 10 includes a second set of openings 58, generally laterally displaced from the first set of openings 56, that defines a set of alignment pin grooves. These openings will be discussed in greater detail hereinbelow in connection with discussions of FIGS. 3 and 4.

Figure 2:
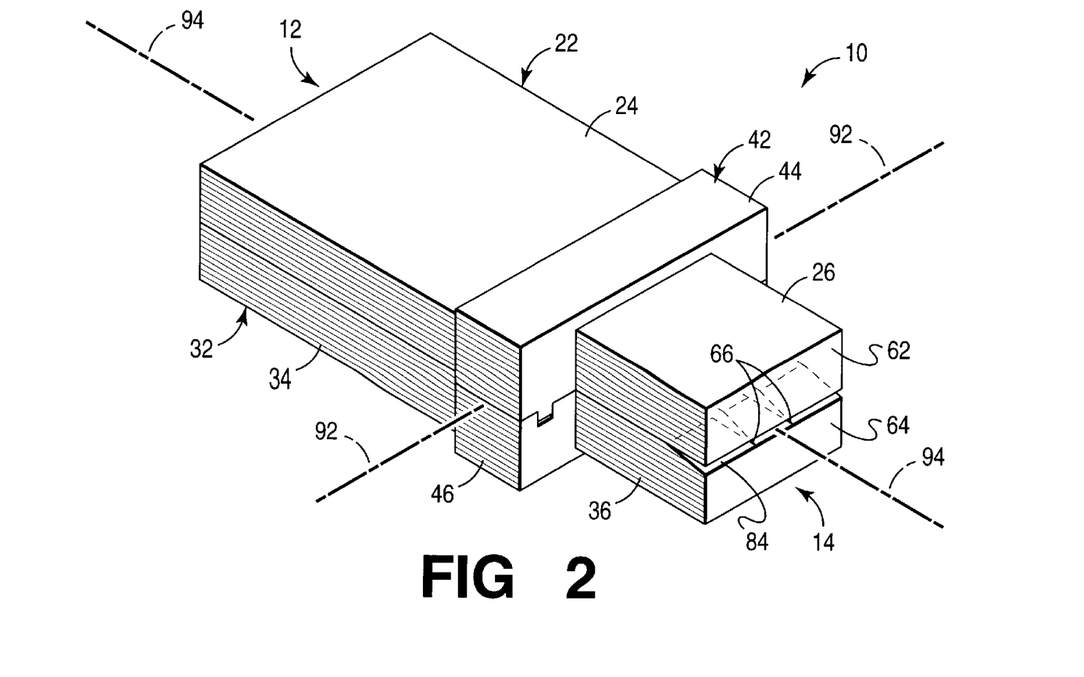
FIG. 2 is a rear, perspective view of the connector of FIG. 1.

FIG. 2 illustrates the connector 10 of FIG. 1 from another perspective, i.e., a perspective that illustrates the back end 14 of the connector 10 more clearly. The upper housing member 22 has a (first) back end surface 62 that, along with a (second) back end surface 64 of the lower housing member 32, defines a back surface. The back surface is configured to receive an optical fiber or fiber array for terminating the fiber(s) in the connector 10. More specifically, the back surface includes a set of fiber support grooves 66 dimensioned and arranged to receive an optical fiber or fiber array in such a way as to optically couple the optical fibers with the waveguide or optical fibers in the front end 12 of the connector 10.

According to embodiments of the invention, the back end 14 of the connector 10 is made to receive optical fibers and optical fiber arrays more easily than conventional connectors, thus improving the viability of terminating optical fibers in the field rather than in less hostile environments. For example, one or both of the first back end surface 62 and the second back end surface 64 is shaped, configured or otherwise has one or more features that slightly increases the opening formed between the first back end 26 and the second back end 36. In this manner, the increased opening provides greater accessibility to the set of fiber support grooves 66 than conventional configurations. In this manner, optical fibers and fiber arrays are more easily inserted into the fiber support grooves, thus improving the likelihood of successful field terminations of the connector 10. Alternatively, one or both of the first back end surface 62 and the second back end surface 64 is configured to rotate so that the opening between the first back end 26 and the second back end 36 is made slightly greater than in conventional configurations.

Figure 3:
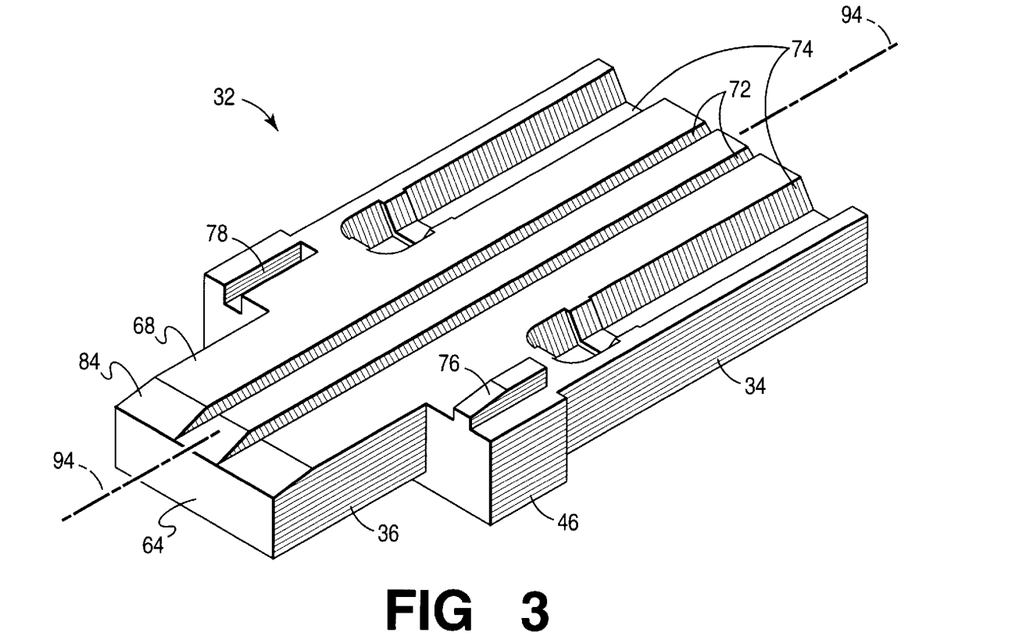
FIG. 3 is a perspective view of a connector housing according to an embodiment of the invention.

Referring now to FIG. 3, with continuing reference to FIGS. 1 and 2, a housing member, e.g., the lower housing member 32 shown in FIGS. 1–2, is shown. The housing member has a mating surface 68 that generally comes into close proximity (e.g., approximately 5–10 microns) with the mating surface of a complementary housing member (not shown) during the formation of the connector 10. The mating surface 68 has a number of features formed therein that either match or are mated with corresponding features of the mating surface of a complementary housing member. For example, the mating surface 68 includes one or more waveguides or fiber support channels 72, alignment pin support channels 74, alignment detents or stubs 76 and alignment notches 78.

The waveguide or fiber support channels 72 are formed generally as shown to combine with similar channels formed in complementary housing members to form, e.g., one or more waveguides or optical fiber support grooves that extend longitudinally within the connector 10 between the front end 12 and the back end 14. The longitudinally-extending waveguides define the openings 56 in the front surface and the openings 66 in the back surface of the connector 10. The channels 72 are shaped as desired, but typically are unshaped (square) or v-shaped, as is conventional in the art. In one arrangement, the channels 72 are formed in the mating surface 68 to define, with the channels formed in the mating surface of a complementary housing member, a linear array of waveguides, e.g., as is used typically in optical circuits.

Alternatively, the channels 72 are positioned and dimensioned in the mating surface 68 to combine with similar channels of a complementary housing member to form one or more optical fiber support grooves for aligning and positioning one or more optical fibers longitudinally within the connector 10. See, e.g., the housing member 32 shown in FIG. 4, in which the channels 72 support a corresponding number of optical fibers 73 that extend through the front end 34 of the housing member 32 to the back end 36 of the housing member 32 and almost to the back end surface 64 of the housing member 32. Although only two channels 72 are shown in both FIGS. 3 and 4, it is possible to form any number of channels in the mating surface 68 of the housing member 32.

For example, a plurality of v-shaped channels parallel to one another and running longitudinally between the front and back ends of the housing member are formed in the mating surface of the housing member to mate with a corresponding plurality of v-shaped channels from a complementary housing member. The resulting formation is a linear array of v-grooves dimensioned to support a linear array of optical fibers, e.g., a ribbon array of optical fibers or an optical fiber ribbon array. Typically, in this manner, the ends of the individual fibers within a fiber ribbon array are stripped, cleaved and positioned between the channels prior to the housing members being mated to form the connector. The optical fibers extend through the front end and generally into a portion of the back end of the connector.

Figure 4:
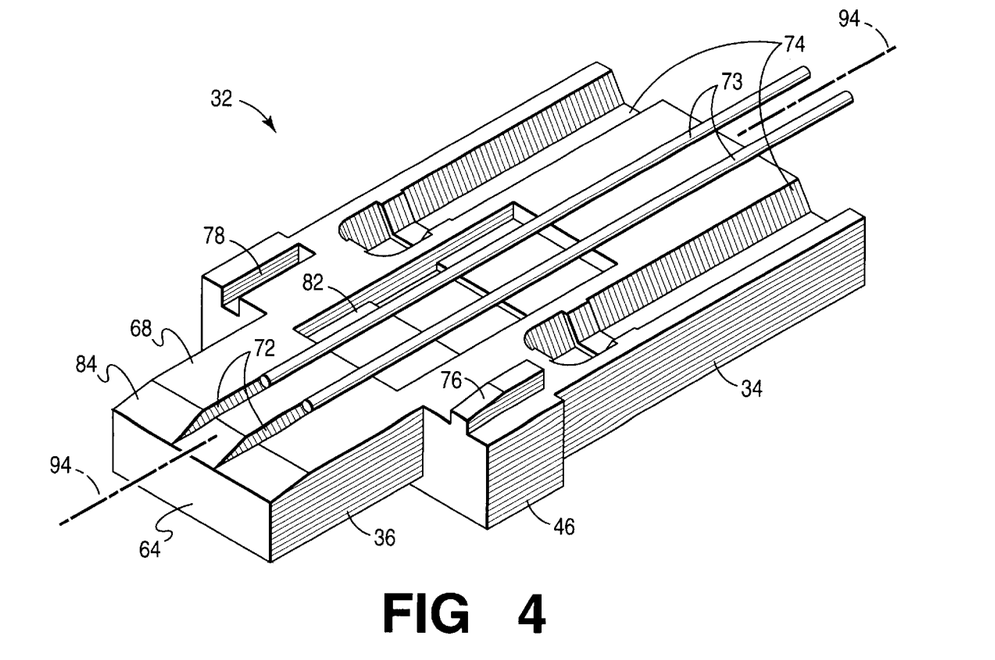
FIG. 4 is a perspective view of the connector of FIG. I showing optical fibers positioned therein.

Typically, an epoxy or other suitable bonding material is applied to the fiber array and/or in the fiber support channels to hold the fiber array within the v-grooves and/or to hold the mating surfaces of the housing members together. Alternatively, the housing members are held together mechanically, e.g., by a clamp, a spring clip or other suitable device. As shown in FIG. 4, alternatively, the housing member includes a pocket or cavity 82 formed in the mating surface 68. The cavity 82 is positioned and dimensioned to accommodate, e.g., excess epoxy. Also, as in conventional arrangements, it is possible for the cavity to house a lens or group of lenses that enhance optical coupling between optical fibers in the back end 14 of the connector 10 and the waveguides or optical fibers in the front end 12 of the connector 10.

Upon securing the position of the fibers within the housing members, e.g., by curing the bonding material, the excess portion of the fiber array extending out of the front end 12 of the connector 10 is cleaved and the fiber ends are polished along with the front end surface of the connector 10, as discussed previously herein. The resulting front end surface is suitable for butt coupling with similar front end surfaces and other compatible devices.

The housing members include a pair of alignment pin support channels 74 on either side of the channels 72. The alignment pin support channels 74 are formed generally as shown to combine with similar alignment pin support channels in complementary housing members to form, e.g., one or more alignment pin grooves. In a conventional manner, the alignment pin grooves are positioned and dimensioned to receive alignment pins (not shown). Alignment pins assist in aligning and holding together connectors that are being butt coupled.

The housing members include an alignment detent 76 on one side of the channels 72 and a complementary alignment detent notch 78 on the other side of the channels 72. The alignment detent 76 and the detent notch 78 are used conventionally to assist in aligning an upper housing member with a lower housing member when mating the two housing to form the connector 10. When forming the connector 10, the alignment detent of the upper housing member engages the detent notch of the lower housing member and the alignment detent of the lower housing member engages the detent notch of the upper housing member.

According to embodiments of the invention, the back end 14 of the connector 10 is shaped or otherwise configured to accommodate field installation of optical fibers and optical fiber arrays therein in a manner that couples the installed optical fibers with the waveguides or the optical fibers positioned in the channels 72. For example, as can be seen in FIGS. 1–4, the back end of the lower housing member 32 has a beveled portion 84 that widens or increases the opening between the upper housing member 22 and the lower housing member 32 at the back end 14 of the connector 10. In this manner, optical fibers are terminated in the back end 14 of the connector 10 while the housing members are already mated together. Conventionally, fibers are terminated in the back end 14 of the connector 10 much as fibers are terminated in the front end 12 of the connector 10, i.e., the fibers are positioned in the fiber support channels 72 of the housing members prior to the housing members being mated together. Such activity is difficult to perform accurately in the field and requires many tools and equipment. According to embodiments of the invention, such polishing tools and associated processes are not required.

Figure 5A:
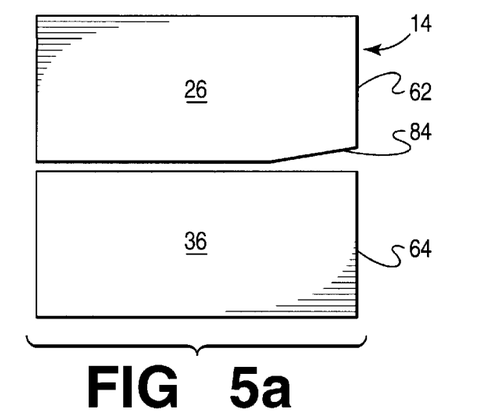
FIGS. 5a–5c are side, cross-sectional views of a portion of the back end of a connector housing according to various embodiments of the invention.

Referring now to FIGS. 5a–c, the configuration of the back end 14 of the connector 10 is shown according to various embodiments of the invention. In FIG. 5a, the back end 14 of the connector 10 is shown in which the back end surface 62 of the upper back end 26 includes a beveled portion 84 that increases the opening between the back end surface 62 of the upper back end 26 and the back end surface 64 of the lower back end 36. For example, the beveled portion 84 increases an opening typically within the range from approximately 50–100 microns ($\mu$m) by another 50–100 $\mu$m. Of course, it is possible to configure the beveled portion 84 in a manner that increases the size of opening as desired.

Figure 5B:
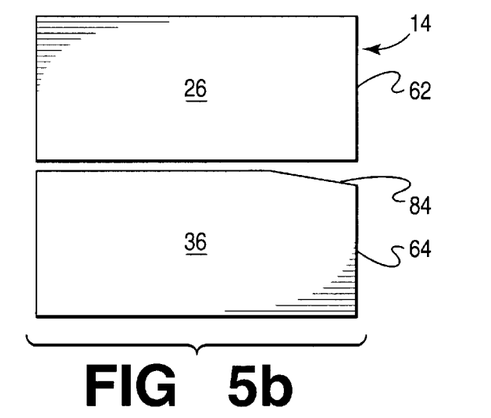
Figure 5C:
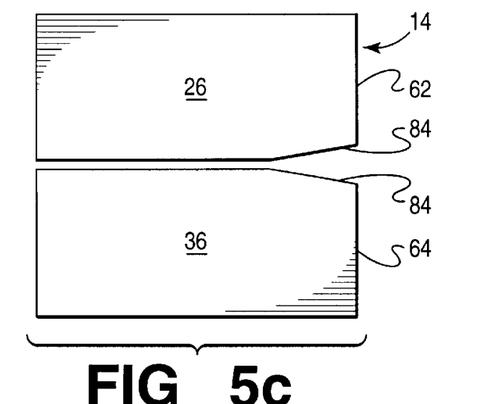

Also, according to an alternative embodiment of the invention, as shown in FIG. 5b, the lower back end 36, rather than the upper back end 26, includes the beveled portion 84 that increases the opening therebetween. Alternatively, as shown in FIG. 5c, both the upper back end 26 and the lower back end 36 include beveled portions 84 that increase the opening therebetween.

Figure 6A:
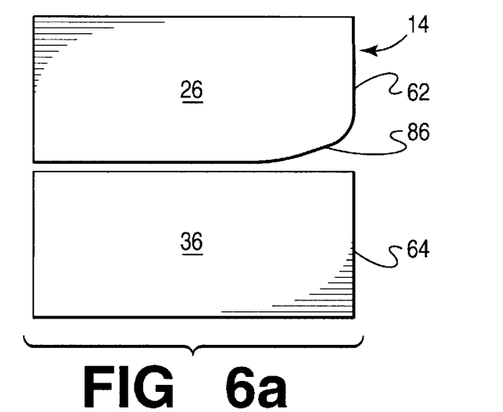
FIGS. 6a–6c are side, cross-sectional views of a portion of the back end of a connector housing according to various alternative embodiments of the invention.
Figure 6B:
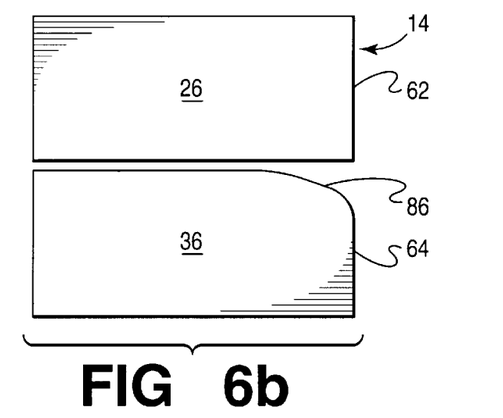
Figure 6C:
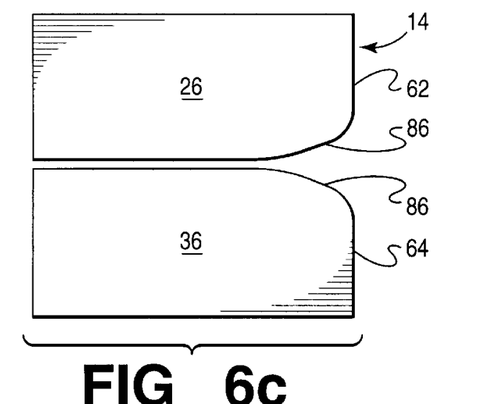

Referring now to FIGS. 6a–6c, according to yet other alternative embodiments of the invention, the back end 14 of the connector 10 includes a rounded corner or curvelinear region 86 that increase the opening between the upper and lower housing members at the back end 14 of the connector 10. For example, as shown in FIG. 6a, the upper back end 26 includes a curvelinear region 86 while the lower back end 36 does not. Alternatively, in an embodiment shown in FIG. 6b, the lower back end 36 includes the curvelinear region 86 and the upper back end 26 does not. Alternatively, as shown in FIG. 6c, both the upper back end 26 and lower back end 36 include curvelinear region 86.

As discussed previously herein, the increased opening between the upper housing member and the lower housing member at the back end 14 of the connector 10 allows optical fibers and optical fiber arrays to be received more easily by the v-grooves 66 at the back end 14 of the connector 10 while the housing members remain mated. In this manner, the ability to field install optical fibers including fiber ribbon arrays is improved over conventional arrangements. Thus, in the field, the fibers to be field installed are cleaved and positioned in the v-grooves 66 at the back end 14 of the connector 10. Also, it is possible to apply index matching gels for reducing any interconnection loss and back reflections at the optical interconnections in the back end 14 of the connector 10.

Typically, no epoxy is used to secure optical fibers or fiber ribbon arrays at the back end 14 of the connector 10. Rather, a conventional spring clip or other suitable mechanical clamping device typically is used. Also, no polishing tools or processes are needed, unlike those needed when terminating optical fibers at the front end 12 of the connector 10.

Figure 7:
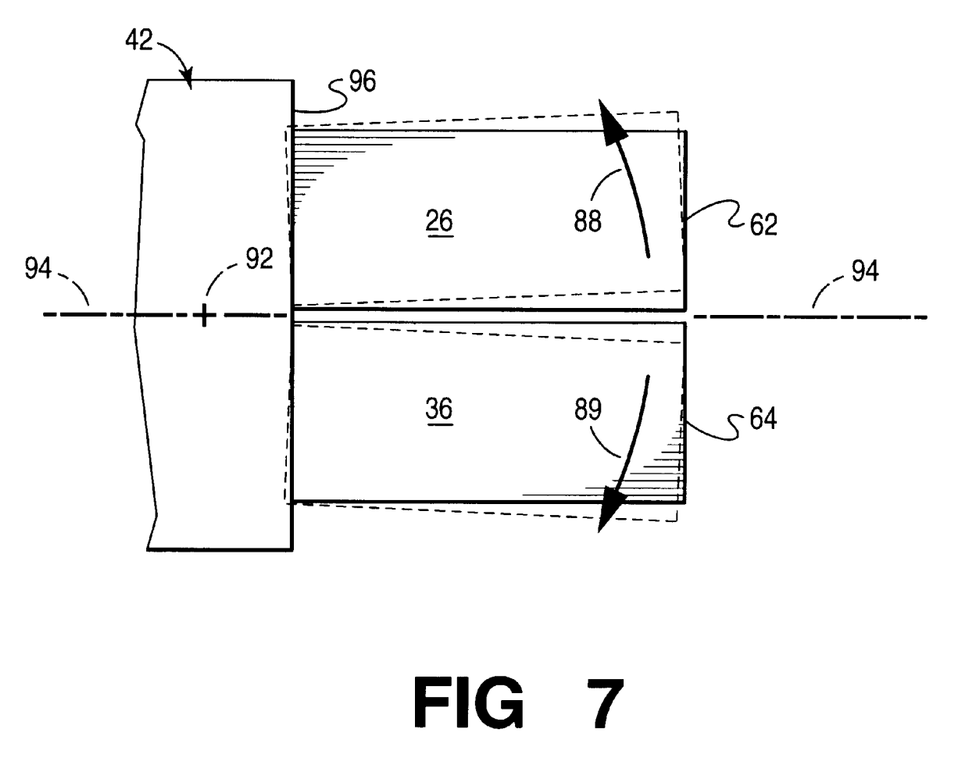
FIG. 7 is a side, cross-sectional view of a portion of the back end of a connector housing according to an alternative embodiment of the invention.

Referring now to FIG. 7, according to alternative embodiments of the invention, the upper back end 26 and/or the lower back end 36 has a limited range of rotation (shown generally by the arrows 88, 89) about an axis 92 (shown in FIGS. 1–4) orthogonal to the longitudinal axis 94 of the connector 10. The limited range of rotation allows the opening between the upper and lower housing members at the back end of the connector 10 to be increased, thus increasing the ease with which optical fibers including fiber ribbon arrays are inserted into and terminated in the back end of the connector 10.

According to embodiments of the invention, the back end of one or both housing members rotates between a normally-closed position and an open position (shown generally by the dashed lines in FIG. 7). For example, the back end(s) are spring loaded and biased in the closed position. Alternatively, other suitable forms of biasing are used.

The limited range of rotation is made possible by any suitable manner including, e.g., the pliability of the material used to fabricate the housing member(s) and the configuration of the back end of the housing member(s) with respect to the collar 42 and the rest of the respective housing member(s). For example, the collar 42, as shown in FIG. 7, has a surface 96 that deforms sufficiently to allow, e.g., the upper back end 26 to rotate slightly upward direction (i.e., as shown generally by the arrow 88) and/or the lower back end 36 to rotate slightly downward (i.e., as shown generally by the arrow 89), thus increasing the opening formed between the upper back end 26 and the lower back end 36. Alternatively, the collar 42 has an indented region (not shown) just behind one or both housing members that provides sufficient freedom of movement for the back end to rotate in the desired direction.

Referring again to FIGS. 1–4, although the housing members are shown as a single piece, according to embodiments of the invention, one of the housing members (e.g., the upper housing member) comprises two separate pieces connected, e.g., by the collar 42. In this manner, the upper housing member 22 includes a first piece corresponding to the front end of the connector and a second piece corresponding to the back end of the connector. In such embodiment, the first piece is bonded or otherwise permanently fixed to the front end portion of the lower housing member 32, thus forming one or more waveguides or terminating one or more optical fibers therein, as discussed hereinabove. The second piece is not permanently fixed to the back end portion 36 of the lower housing member 32 but is removable for allowing cleaved optical fibers or fiber arrays to be positioned therein for coupling to the optical waveguide or fibers fixed in the front end of the connector 10.

It will be apparent to those skilled in the art that many changes and substitutions can be made to the embodiments of the optical fiber connector devices, methods and systems herein described without departing from the spirit and scope of the invention as defined by the appended claims and their full scope of equivalents. For example, it is possible for embodiments of the invention to have housing members that include both a beveled or curvelinear portion and the ability to rotate slightly open or outward.

What is claimed is:

1. A connector for terminating at least one optical fiber, said connector comprising:

a first housing member having a front end and a back end; and a second housing member having a front end and a back end and intermatable with the first housing member to form an optical waveguide between the front and back ends, wherein, when the first and second housing members are mated, the front ends of the first and second housing members form a front surface for butt coupling to other front surfaces, and wherein the back end of at least one of the housing members has a back end surface with at least one feature that, when the first and second housing members are mated, increases access to an opening formed with the back end surface of the other housing member to facilitate insertion of the at least one optical fiber into the back end of the connector for optically coupling with the optical waveguide.

2. The apparatus as recited in claim 1, wherein the back end of at least one of the housing members has a beveled portion that increases the opening between the back ends of the first and second housing members when the first and second housing members are mated.

3. The apparatus as recited in claim 1, wherein the back end of the housing members has a mating surface and wherein the back end of at least one of the housing members has a back end surface with a curvelinear portion formed integrally with its mating surface that increases the opening between the back ends of the first and second housing members when the first and second housing members are mated.

4. The apparatus as recited in claim 1, wherein the back end of at least one of the housing members is configured to move between an open position and a closed position, wherein the opening formed between the back end surfaces of the housing members when the housing members are mated is greater when at least one of the housing members is in the open position than in the closed position.

5. The apparatus as recited in claim 4, wherein the back end of the housing members is spring loaded and biased in the closed position.

6. The apparatus as recited in claim 4, wherein the back end of at least one of the housing members is rotatable between the open and closed positions about an axis orthogonal to the longitudinal axis of the connector.

7. The apparatus as recited in claim 1, wherein the at least one optical fiber further comprises an array of optical fibers.

8. The apparatus as recited in claim 1, wherein at least one of the first and second housing members includes a plurality of optical fiber support grooves that extend longitudinally from the front end to the back end, the optical fiber support grooves configured to support an array of optical fibers.

9. The apparatus as recited in claim 8, wherein the fiber support grooves are v-shaped in cross section.

10. The apparatus as recited in claim 1, further comprising at least one lens positioned within the connector and disposed between the at least one optical fiber and the optical waveguide.

11. The apparatus as recited in claim 1, wherein at least a portion of at least one of the first and second housing members is made of plastic.

12. The apparatus as recited in claim 1, wherein at least one of the first and second housing members includes at least one alignment groove that extends longitudinally from the front end toward the back end, the alignment groove dimensioned to receive an alignment pin for aligning the connector with other connectors.

13. The apparatus as recited in claim 1, wherein the first and second housing members have complementary alignments features that cause the front and back ends of the first and second housing members to be aligned with respect to one another when the first and second housing members are mated.

14. A method for using an optical fiber connector in an optical fiber communication system, said method comprising the steps of:
    providing an optical fiber connector formed by mating first and second housing members, the connector having a front end, a back end and an optical waveguide formed between the front and back ends, wherein the back end of at least one of the housing members has a back end surface with at least one feature that, when the first and second housing members are mated, increases access to an opening formed with the back end surface of the other housing member to facilitate insertion of an array of optical fibers into the back of the connector for optically coupling with the optical waveguide; and
    inserting an array of optical fibers into the back end of the connector when the first and second housing members are mated, wherein the array of optical fibers is inserted in such a way that the array of optical fibers is optically coupled with at least a portion of the optical waveguide.

15. The method as recited in claim 14, further comprising the step of mechanically clamping the back end of the connector to maintain the position of optical fibers inserted into the back end of the connector.

16. The method as recited in claim 14, wherein, before the inserting step, the ends of the array of optical fibers are stripped and cleaved.

17. A method for making an optical fiber connector, said method comprising the steps of:
    providing a first housing member having a front end and a back end;
    providing a second housing member having a front end and a back end and intermatable with the first housing member; and
    mating the first and second housing members,
    wherein at least one of the first and second housing members has a mating surface configured in such a way that, when the first and second housing members are mated, an optical waveguide is formed therebetween,
    wherein, when the first and second housing members are mated, the front ends of the first and second housing members form a front surface for butt coupling to other front surfaces, and
    wherein the back end of at least one of the housing members has a back end surface with at least one feature that, when the first and second housing members are mated, increases access to an opening formed with the back end surface of the other housing member to facilitate insertion of an array of optical fiber into the back end of the connector for optically coupling with the optical waveguide.

18. The method as recited in claim 17, wherein at least one of the housing members has a back end with a beveled portion that increases the opening between the back ends of the first and second housing members when the first and second housing members are mated.

19. The method as recited in claim 17, wherein the back ends of the housing members have respective mating surfaces, and wherein the back end of at least one of the housing members has a curvelinear portion formed integrally with its mating surface that increases the opening between the back ends of the first and second housing members when the first and second housing members are mated.

20. The method as recited in claim 17, wherein at least one of the housing members is provided with a back end configured to move between an open position and a closed position, wherein the opening formed between the back end surfaces of the housing members when the housing members are mated is greater when at least one of the housing members is in the open position than in the closed position.

21. The method as recited in claim 20, wherein the back end of the housing members is spring loaded and biased in the closed position.

22. The method as recited in claim 20, wherein the back end of at least one of the housing members is rotatable between the open and closed positions about an axis orthogonal to the longitudinal axis of the connector.

23. The method as recited in claim 17, wherein at least one of the first and second housing members has a plurality of optical fiber support grooves that extend longitudinally from the front end to the back end, and wherein the optical fiber support grooves are configured to support the optical fibers of at least one array of optical fibers.

24. An optical waveguide system for transmitting optical energy, comprising:
    at least one source of optical energy;
    at least one receiver for receiving optical energy; and
    an optical energy transmission medium coupled between the source and the receiver for transmitting optical energy from the source to the receiver, wherein at least a portion of the optical energy transmission medium includes at least one connector for terminating at least one first array of optical fibers for optically coupling with at least one corresponding second array of optical fibers,
    wherein the at least one connector includes
    a first housing member having a front end and a back end, and
    a second housing member having a front end and a back end and intermatable with the first housing member to form an optical waveguide between the front and back ends,
    wherein, when the first and second housing members are mated, the front ends of the first and second housing members form a front surface for butt coupling to the front surface of another connector, and wherein the back end of at least one of the housing members has a back end surface with at least one feature that, when the first and second housing members are mated, increases access to an opening formed with the back end surface of the other housing member to facilitate insertion of an array of optical fibers into the back end of the connector for optically coupling with the optical waveguide.

25. The system as recited in claim 24, wherein the back end of at least one of the housing members has a beveled portion that increases an opening between the back ends of the first and second housing members when the first and second housing members are mated.

26. The system as recited in claim 24, wherein the back end of the housing members has a mating surface and wherein the back end of at least one of the housing members has a back end surface with a curvelinear portion formed integrally with its respective mating surface that increases the opening between the back ends of the first and second housing members when the first and second housing members are mated.

27. The system as recited in claim 24, wherein the back end of at least one of the housing members is configured to move between an open position and a closed position, wherein the opening formed between the back end surfaces of the housing members when the housing members are mated is greater when at least one of the housing members is in the open position than in the closed position.

28. The system as recited in claim 27, wherein the back end of the housing members is spring loaded and biased in the closed position.

29. The system as recited in claim 27, wherein the back end of at least one of the housing members is rotatable between the open and closed positions about an axis orthogonal to the longitudinal axis of the connector.

* * * * *